Patented Mar. 2, 1926.

1,574,844

UNITED STATES PATENT OFFICE.

RENÉ OPPENHEIM, OF LEVALLOIS-PERRET, FRANCE, ASSIGNOR TO SOCIETE ANONYME LE CARBONE, OF LEVALLOIS-PERRET, SEINE, FRANCE.

PROCESS FOR PROTECTING GAS-ABSORBING SUBSTANCES FROM PENETRATION BY LIQUID.

No Drawing. Application filed April 26, 1923. Serial No. 634,857.

*To all whom it may concern:*

Be it known that I, RENÉ OPPENHEIM, of 12 and 33 Rue de Lorraine, Levallois-Perret, Seine, France, have invented Processes for Protecting Gas-Absorbing Substances from Penetration by Liquid, of which the following is a full, clear, and exact description.

In the patent application filed on the 30th June 1922, Serial No. 571,926, has been described a method of protection of porous bodies, and particularly the porous bodies of electrodes of batteries or electrolyzing apparatus, against the penetration by liquids, consisting, substantially, in applying on the surface of these porous bodies an adherent coating constituted by a pectized nonmetallic colloid.

According to the methods described by way of example in the patent application Serial No. 571,926, the pectization of the colloid is effected by the porous body itself, by the simple immersion of the latter in the nonmetallic colloidal suspension.

The coating thus obtained is applied on the porous body, with the maximum of adherence. Moreover, in the case of the application of this coating on the porous bodies of electrodes of batteries or electrolyzing apparatuses, this process has the advantage of providing between the coating and the electrolyte a perfect electric contact and of consequently reducing to the minimum the internal ohmic resistance of these batteries or electrolyzing apparatuses.

The present invention relates to another method of producing the protecting coating forming the subject-matter of the patent application Serial No. 571,926.

As is known, there are on the market nonmetallic colloids, pectized beforehand and delivered in thin sheets; as examples can be mentioned: cellophan, or an asbestos fabric impregnated with colloidal silica by reaction of diluted sulphuric acid on silicate of soda.

The method forming the subject-matter of the present invention consists, substantially, in wrapping round the porous body one or more sheets of a nonmetallic colloid pectized beforehand, such as cellophan or an asbestos fabric impregnated with colloidal silica.

This colloidal sheet is firmly held upon the porous body by a flexible bond wound in a spiral or arranged in any other manner.

For the purpose of ensuring a perfect contact between the colloidal coating and the porous body, it is preferable to interpose between them a plastic material, which is a good conductor of electricity, such for instance as plumbago in the form of a fine powder slightly moistened with boiling water.

Claims:

1. A process for protecting gas absorbing substances against liquid penetration and particularly the porous substances of batteries and electrolyzers consisting in covering the porous bodies with a pectized colloid in the form of a sheet, such for example as cellophane such pectized colloid sheet having the two-fold property of being impenetrable to liquids and permitting the passage of gases.

2. A process for protecting gas absorbing substances against liquid penetration and particularly the porous substances of batteries and electrolyzers consisting in coating the outer surface of the porous body with a plastic material conductor of electricity, and in then wrapping about the latter a sheet of nonmetallic pectized colloid and in securing it thereon by a bond firmly tightened.

3. A process for protecting gas absorbing substances against liquid penetration and particularly the porous substances of batteries and electrolyzers consisting in coating the outer surface of the porous body with plumbago in the form of a fine powder moistened with boiling water, and in then wrapping about the said surface a sheet of nonmetallic pectized colloid and in securing it thereon by a bond firmly tightened.

4. A process for protecting gas absorbing substances against liquid penetration and particularly the porous substances of batteries and electrolyzers consisting in coating the outer surface of the porous body with a plastic material conductor of electricity, and in then wrapping about the said surface a sheet of cellophan and in securing it thereon by a bond firmly tightened.

The foregoing specification of my "Liquid-tight coating on porous bodies, particularly applicable on the porous bodies of electrodes of batteries or electrolyzing apparatuses" signed by me this 14th day of April, 1923.

RENÉ OPPENHEIM.